J. BAEUMLE.
CLOTHES LINE HOLDER.
APPLICATION FILED DEC. 30, 1912.
1,140,787.
Patented May 25, 1915.
2 SHEETS—SHEET 2.
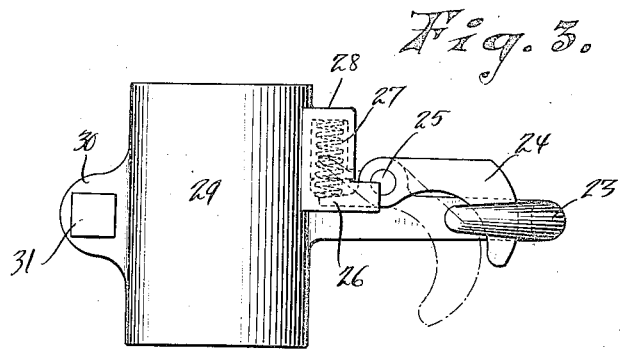
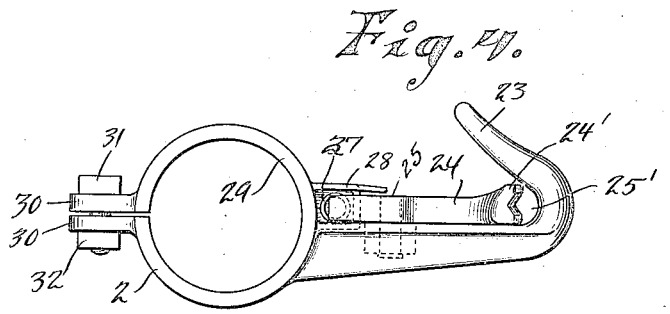
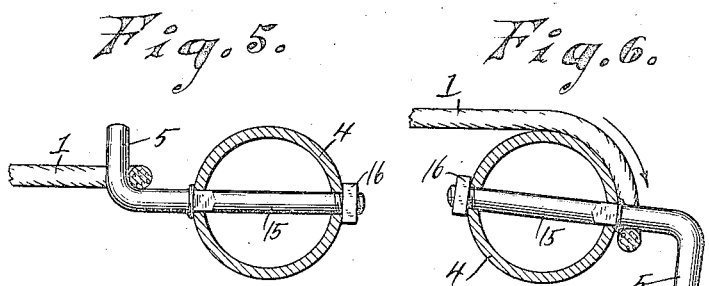
Witnesses:
Inventor:
John Baeumle
By Erwin & Wheeler
Attorneys.

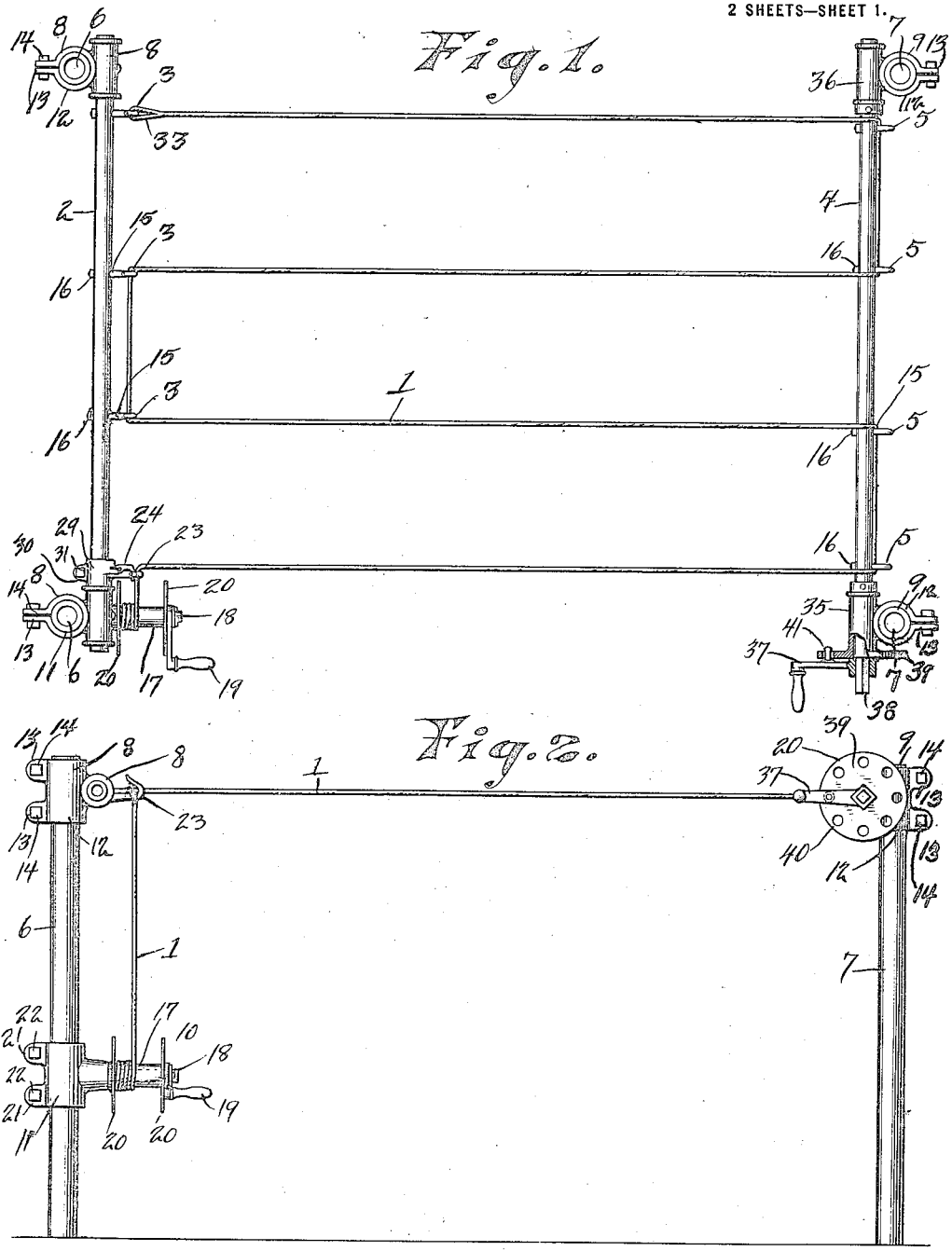

UNITED STATES PATENT OFFICE.

JOHN BAEUMLE, OF MILWAUKEE, WISCONSIN.

CLOTHES-LINE HOLDER.

1,140,787.        Specification of Letters Patent.        Patented May 25, 1915.

Application filed December 30, 1912. Serial No. 739,175.

*To all whom it may concern:*

Be it known that I, JOHN BAEUMLE, a citizen of the United States, residing at Milwaukee, county of Milwaukee, and State of Wisconsin, have invented new and useful Improvements in Clothes-Line Holders, of which the following is a specification.

My invention relates to improvements in clothes line holders.

The object of my invention is, among other things, 1st, to provide a device for supporting a clothes line by which the slack in the entire line may be quickly and easily taken up at the same time without drawing the line longitudinally through its supporting bearings; 2nd, to provide a device by which the line may be quickly disengaged from one of its supporting shafts by simply turning such shaft a partial revolution preparatory to winding the line upon a supporting reel; and 3rd, to provide a device for automatically holding the line while the same is being tightened upon its supporting shafts.

My invention is further explained by reference to the accompanying drawings, in which—

Figure 1 represents a plan view and Fig. 2 is an end view of the device for supporting the line. Fig. 3 is a top view and Fig. 4 is an end view of the hook for holding the line while being tightened upon its supporting shafts. Figs. 5, 6 and 7 are end views of the shaft in three different positions, Fig. 5 showing the position when the line is first placed upon the winding hooks, Fig. 6 showing the position of the shaft as the line is being tightened, and Fig. 7 showing the position of the shaft in position for disengaging the line from the hooks.

Like parts are identified by the same reference numerals throughout the several views.

1 represents the clothes line which is supported from the stationary shaft 2 through a plurality of hooks 3 and from the winding shaft 4 through a plurality of hooks 5. The shafts 2 and 4 are supported at their respective ends from the vertical posts 6 and 7 through the coupling clamps 8, 8, and 9, 9. A line supporting reel of ordinary construction is supported from one of the posts 6 by a coupling clamp 11. The coupling clamps 8, 8, and 9, 9, each comprise a vertical sleeve 12 and one or more clamping lugs 13 and clamping bolts 14, and said sleeves are sufficiently flexible to permit of being drawn firmly together around and against their supporting posts 6 and 7 respectively, whereby they are rigidly retained in place.

The shafts 2 and 4 are provided with apertures for the reception of the shanks 15 of the several hooks, and said shanks are inserted through said apertures and secured in place by nuts 16, having threaded bearings on the shanks of said hooks, whereby said hooks are securely retained in place. The reel comprises the hollow sleeve 17, which is revolubly supported on the shaft 18, an operating handle 19, and a pair of side disks 20, 20, while said shaft and sleeve are supported from the vertical posts 6, as stated, by the clamping coupling 11, which coupling 11 is provided with a plurality of lugs 21. Each of said lugs is in turn provided with clamping bolts 22, of ordinary construction, whereby when the nuts are turned down on said bolts, said clamping couplings are rigidly secured in place upon said post. The line supporting hook 23 is provided with an eccentric cam 24, which is pivotally supported from one side of said hook on a pin 25, and said eccentric cam is provided with a lug 26 located on the opposite side of said pin 25 from the hook, which is adapted to bear against one end of the spiral spring 27 shown in dotted lines in Fig. 3, and the spring 27 is retained in yielding contact with said lug 26 by the inclosing housing 28, which housing 28 is formed integrally with or secured to one side of the supporting sleeve 29. The sleeve 29 is rigidly secured to the shaft 2 by the clamping lugs 30 and clamping bolt 31. The clamping bolt 31 is provided with a nut 32, which has threaded bearings thereon, whereby as said nut is turned down on said bolt 31, said sleeve 29 is rigidly clamped to said shaft 2.

It will be understood that when putting up the line, it is first carried from the reel to and is placed over the first and second hooks 5, 5 on the revoluble shaft 4, thence over the third and fourth hooks 3, 3, on the stationary shaft 2, and thence over the third and fourth hooks on the revoluble shaft 4, and thence to the last hook on the stationary shaft 2, when the loop 33 of said line is placed over the last hook. When this is done, that portion of the line nearest the reel is placed over the hook 23 on the stationary shaft beneath the eccentric 24', and the eccentric 24' is adapted as the line is tightened to impinge against the same, whereby the line is clamped between the end 24 of the eccentric and the hook 23, and prevented from being withdrawn farther from the reel. When the line has been thus placed in the hooks of the supporting shafts 2 and 4, the slack in the line is taken up by turning the winding shaft 4 in its supporting sleeves 35 and 36. As the shaft 4 is thus revolved, the line is wound around said shaft, as indicated in Fig. 6, whereby the slack is taken up in all parts of the line simultaneously without drawing such line longitudinally through its supporting hooks. As the line is being thus wound upon the shaft 4, the eccentric cam 24 is caused by the movement of the line and the recoil of the spiral spring 27, to be moved from the position indicated in dotted lines in Fig. 3 to that shown in full lines in said figure, whereby the line is firmly clamped between the end 24' of said cam and the opposing surface 25' of said hook, and whereby the line is prevented from being further unwound from the reel as it is being tightened. The shaft 4 is revolved by turning the crank arm 37 which crank has angular bearings 38 on the shaft 4, whereby said shaft is revolved.

39 is a disk which is formed integrally with the stationary sleeve 35, and said disk is provided with a plurality of apertures 40 for the reception of the pin 41, which pin 41 is formed integrally with or rigidly connected to the crank 37. The crank 37 is slidably supported on the shaft 4, whereby it is adapted to be drawn back from the disk 39 and the pin 41 disengaged from said disk. When, however, the slack has been taken up in the line 1, the crank 37 is pushed forwardly until the pin 41 enters one of said apertures 40, whereby the crank is prevented from being revolved by the tension or elastic pull of said line. It will be understood that the crank 37 may, if desired, be pivotally connected with said shaft 4, in which case it may be turned on its pivotal support as the pin 41 is brought into and out of engagement with the disk. When through using the line, it is readily disengaged from the hooks 5 of the revoluble shaft by disengaging the pin 41 from said disk, when said shaft 4 is permitted to turn back a partial revolution in its supporting bearings from the position shown in Fig. 6 to that shown in Fig. 7, whereby the line is simultaneously disengaged from all of said hooks 5, when it may be readily wound upon the reel by turning the crank 19.

Having thus described my invention, what I claim as new, and desire to secure by Letters Patent, is—

1. In a clothes line holder, the combination of a plurality of series of vertical posts, a revoluble shaft supported from one of said series of posts, a stationary bar rigidly secured to the upper ends of the other series of posts, a crank connected with said revoluble shaft, means for preventing said crank and revoluble shaft from being turned back by the tension of a clothes line wound thereon, a clothes line reel connected with said stationary bar, a crank for winding said reel and a plurality of line supporting hooks connected with said revoluble shaft and stationary bars.

2. In a clothes line holder, the combination of a plurality of series of vertical posts, a shaft revolubly supported from one of said series of posts, a crank connected with said shaft, means for holding said crank at any desired point of adjustment, a stationary bar rigidly affixed to the other series of posts, a plurality of line retaining hooks affixed to both of said shafts, a single clothes line supported from such hooks, a line supporting reel and a hook supported from one of said posts, an eccentric cam pivotally connected with said last named hook, said cam being adapted, when said line is in place in said hook, to prevent said line from being withdrawn from said reel, all substantially as and for the purpose specified.

In testimony whereof I affix my signature in the presence of two witnesses.

JOHN BAEUMLE.

Witnesses:
    JAS. B. ERWIN,
    IRMA D. BREMER.